Nov. 30, 1948.　　　F. P. NOFFSINGER　　　2,455,264
POTATO DIGGER ATTACHMENT FOR TRACTORS
Filed June 21, 1945　　　2 Sheets-Sheet 1

INVENTOR.
FRED P. NOFFSINGER.
BY
ATTORNEY.

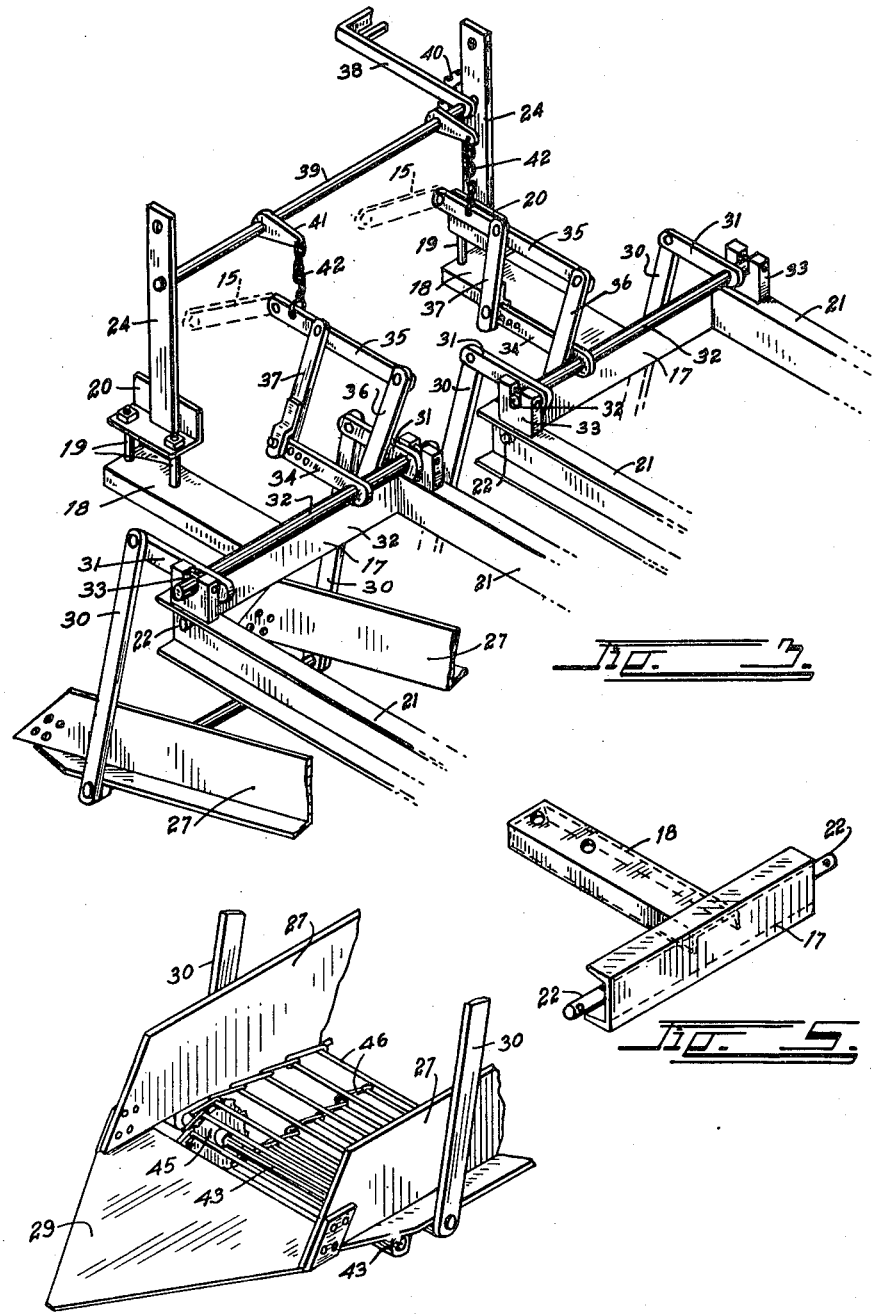

Patented Nov. 30, 1948

2,455,264

UNITED STATES PATENT OFFICE 2,455,264

POTATO DIGGER ATTACHMENT FOR TRACTORS

Fred P. Noffsinger, Greeley, Colo.

Application June 21, 1945, Serial No. 600,793

4 Claims. (Cl. 55—51)

This invention relates to a potato digging attachment for tractors and has for its principal object the provision of a device of this character which can be quickly and easily attached to a tractor of the "Ford" type; which can be attached in multiples so that two or more rows of potatoes can be dug simultaneously; which will be so arranged that the tractive effort of the tractor wheels will be increased to avoid slippage under heavy loads; in which the digging blade can be quickly raised and lowered by operation of the hydraulic lift levers of the tractor; and in which the clod separating action can be adjusted in accord with the type of soil so as to subject the potatoes to a minimum of handling to avoid damage to the potatoes.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 3 is a detail perspective view, illustrating the portions of the attachment which connect with the tractor;

Fig. 4 is a detail perspective view, illustrating one of the digging blades of the improved attachment; and Fig. 5 is a similar view illustrating one of the draw bar brackets employed in the attachment.

Figure 1:
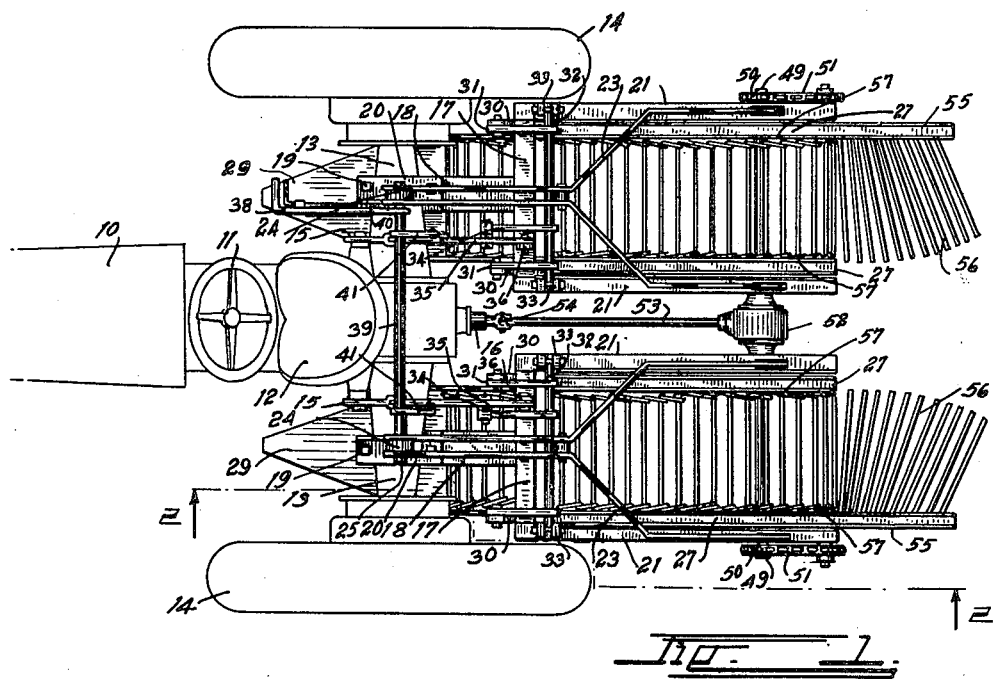
Fig. 1 is a plan view of the improved potato digging attachment, illustrating it in place on a conventional "Ford" tractor.
Figure 2:
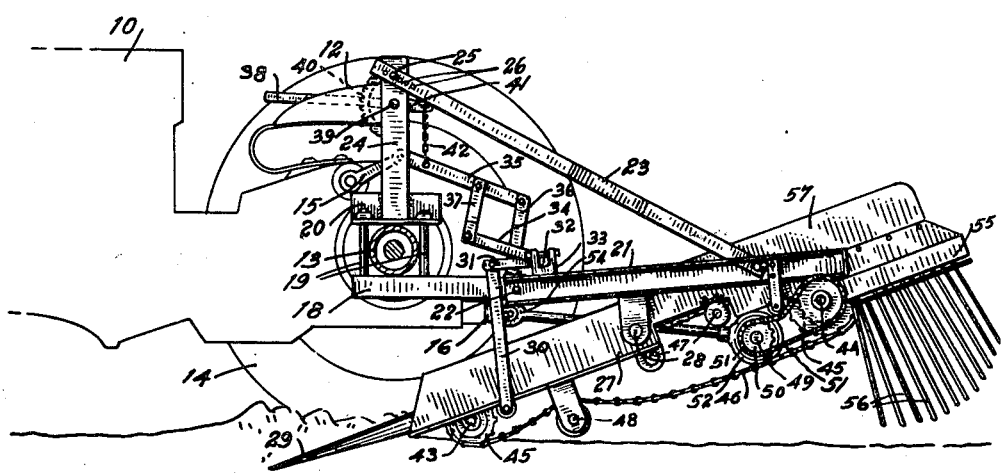
Fig. 2 is a longitudinal section therethrough, taken on the line 2—2, Fig. 1.

In Figs. 1 and 2 typical parts of a tractor of a type particularly adapted to the uses of this invention are indicated by numeral as follows: engine hood 10, steering wheel 11, seat 12, rear axle housing 13, rear wheels 14, hydraulic implement lift levers 15, and power take-off 16.

The improved attachment is attached to the rear axle housing 13, the digging blades are raised and lowered in consequence of the movements of the implement lift levers 15, and the power to operate the attachment is obtained from the power take-off 16.

An illustrated, the device is arranged to dig two rows of potatoes simultaneously, that is, two of the attachments are applied to the tractor, one at each side of the axle housing 13. The two attachments are identical so that a description of one also applies to the other.

Each attachment is supported from a T-shaped draw bar member, as illustrated in Fig. 5, consisting of a horizontal draw bar 17 supported at its middle by means of a bracket iron 18. The latter irons are arranged to be clamped beneath the axle housing 13 at each side of the tractor by means of clamp bolts 19. The bolts 19 span the axle housing and clamp the latter between clamping angles 20, resting thereon, and the bracket irons 18.

A boom member 21 is hinged at its forward extremity to each end of each draw bar 17 on a suitable hinge stud 22. The boom members extend rearwardly and upwardly from the draw bars. The rear extremity of each pair of boom members 21 is supported by means of a Y-shaped hanger 23, each consisting of two bars lying parallel to each other along their upper portions and spread apart at their lower portions so that each bar will hingedly connect with one of the boom members of that pair.

A vertical post 24 is secured to and extends upwardy from each of the clamping angles 20. The bars of each of the Y-shaped hangers 23 extend on each side of the upper extremity of one of the posts 24 and are adjustably secured thereto by means of a bolt 25. The bars of the hangers 23 contain a plurality of spaced-apart openings 26 so that their points of attachment to the posts can be adjusted to support the boom members 21 at the desired angle.

A pair of side frame members 27 is hinged at their rearward extremities, as shown at 28, to each pair of the boom members, adjacent the rear of the latter. The forward extremities of each pair of side frame members 27 are connected by means of a shovel or digger blade 29 fixedly secured across the bottom of the frame member 27 and projecting forwardly therefrom.

The forward extremity of each pair of side frames 27 is suspended by means of hanger bars 30 from hanger levers 31 projecting from a lift shaft 32. The lift shaft 32 is rotatably mounted in V-shaped bearings 33 mounted near the forward ends of the boom members 21. An actuating lever 34 projects forwardly from each lift shaft 32 in alignment with the implement lift levers 15 of the tractor. A cross link member 35 extends from each of the lift levers 15 rearwardly to a hinged connection with a swinging supporting link 36 hingedly mounted on the draw bar 17. A connecting link 37 extends downwardly from each cross link member 35 to the actuating levers 34 of each lift shaft 32. The purpose of the links 35, 36 and 37 is to increase the leverage of the lift levers 15 and to decrease or slow down the speed of movement thereof.

It can be seen that if the levers 15 swing forwardly from their position in Fig. 2 they will cause the links 37 to pull upwardly on the levers 34 causing the shafts 32 to rotate and lift the forward extremities of the side frame members 27. If the levers 15 are allowed to swing rearwardly, they will allow the frame members 27 to descend. The amount of descent can be preset by means of a manual depth lever 38 projecting from a lever shaft 39 extending between the posts 24. The lever 38 is provided with the usual latch which engages a notched segment 40 on one of the posts to lock it in any desired position. An arm 41 extends rearwardly from the shaft 39 over each of the cross link members 35 and a chain 42 extends between each of the arms 41 and the member 35 therebelow. This construction allows the blades 29 to be lifted for turning and travelling purposes but presets the depth to which they can be lowered for digging purposes.

A lower sprocket shaft 43 extends between suitable bearings at the lower extremity of each pair of side frame members 27 and an upper sprocket shaft 44 is similarly mounted between the rearward extremities of each pair of boom members 21. Each sprocket shaft carries chain sprockets 45 for supporting an endless, open-bar type, potato digger chain 46. Supporting cross shafts 47 extend beneath the upper reaches of each chain and are provided with eccentric shaker sprockets for vibrating the chain as is usual in potato machines. An idler sprocket shaft 48 supports the slack in the lower reach of each chain.

The chains 46 are driven from transverse drive shafts 49 through the medium of drive sprockets 50 and transmission chains 51. The drive shafts 49 project from the extremities of an axle housing suspended below the boom members 21. The axle housing is similar to that used on a conventional automobile having differential gears at its middle contained in a differential housing 52 from which a propeller shaft projects forwardly through a torque tube 53. The forward extremity of the propeller shaft is operatively connected to the power takeoff 16 of the tractor through a suitable universal joint 54. A comb bar 55 projects rearwardly from the outermost boom member 21 at each side of the machine. A plurality of flexible, resilient, comb rods 56 project inwardly and downwardly from each comb bar in spaced relation. The rods 56 act to cushion the fall of the potatoes, sift the final clods therefrom and deposit them in a continuous pile between the rows. Side boards 57 extend along the side frame members 27 and the rear extremities of the boom members 21 and comb bars 55 to confine the potatoes and clods to the paths of the bar chains 46.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A potato digging attachment for tractors comprising: a relatively short rearwardly extending, T-shaped draw bar; means for securing said draw bar to a tractor so that the T-head thereof will be supported horizontally to the rear of said tractor; hinge means on each extremity of said T-head; a boom member mounted on each hinge means and extending rearwardly therefrom; a Y-shaped hanger, each of the separated extremities of said hanger being hingedly secured to one of said boom members so that said hanger will support both boom members uniformly and simultaneously; a vertical post; means for securing said post to said tractor; means securing said hanger to said post to support said boom members therefrom; a side frame member hinged to each boom member and extending downwardly and forwardly therefrom in parallel relation; a potato digging blade secured between the forward extremities of said side frame members; a lift shaft journaled on and extending between the forward extremities of said boom members; a hanger lever projecting from said lift shaft over each side frame member; hanger bars suspending each of said frame members from one of said hanger levers; and power operated means operatively connected to rotate said lift shaft so as to raise and lower said side frame members and said digging blade.

2. A potato digging attachment for tractors comprising: a relatively short, rearwardly extending, T-shaped draw bar, means for securing said draw bar to a tractor so that the T-head thereof will be supported horizontally to the rear of said tractor; hinge means on each extremity of said T-head; a boom member mounted on each hinge means and extending rearwardly therefrom; a Y-shaped hanger, each of the separated extremities of said hanger being hingedly secured to one of said boom members so that said hanger will support both boom members uniformly and simultaneously; a vertical post; means for securing said post to said tractor; means securing said hanger to said post to support said boom members therefrom; a side frame member hinged to each boom member and extending downwardly and forwardly therefrom in parallel relation; a potato digging blade secured between the forward extremities of said side frame members; a lift shaft journaled on and extending between the forward extremities of said boom members; a hanger lever projecting from said lift shaft over each side frame member; hanger bars suspending each of said frame members from one of said hanger levers; an actuating lever projecting forwardly from said lift shaft; a power lift lever on said tractor arranged to swing forwardly and backwardly ahead of said actuating lever; a supporting link hingedly mounted on said draw bar and arranged to swing forwardly and backwardly behind said actuating lever; a cross-link member extending from said power lift lever to said supporting link over said actuating lever; and a connecting link extending from said cross-link member downward to said actuating lever to convert the forward and back movements of said cross-link member into vertical movement of said actuating lever to rotate said lift shaft so as to raise and lower said digging blade.

3. Means for raising and lowering a potato digging blade supported from a tractor having a power lift lever arranged to swing forwardly and backwardly comprising: a lift shaft horizontally supported from said tractor above said blade; a hanger lever projecting forwardly from said shaft over each extremity of said blade; hanger bars supporting said blade from said hanger levers; an actuating lever projecting forwardly from said lift shaft to the rear of said power-lift lever; a vertical supporting link hingedly supported from said tractor rearwardly of said actuating lever; a cross-link member extending from said power-lift lever to said supporting link over said actuating lever; and a connecting link extending downward from said cross-link member to said actuating lever to convert the forward and back movement of said cross-link member into vertical movement of said actuating lever to rotate said lift shaft so as to raise and lower said digging blade.

4. Means for raising and lowering a potato digging blade supported from a tractor having a power lift lever arranged to swing forwardly and backwardly comprising: a lift shaft horizontally supported from said tractor above said blade; a hanger lever projecting forwardly from said shaft over each extremity of said blade; hanger bars supporting said blade from said hanger levers; an actuating lever projecting forwardly from said lift shaft to the rear of said power-lift lever; a vertical supporting link hingedly supported from said tractor rearwardly of said actuating lever; a cross-link member extending from said power-lift lever to said supporting link over said actuating lever; a connecting link extending downward from said cross-link member to said actuating lever to convert the forward and back movement of said cross-link member into vertical movement of said actuating lever to rotate said lift shaft so as to raise and lower said digging blade; a manually operated pre-set lever positioned above said cross-link member; and flexible means connecting said manually operated pre-set lever with said cross-link member to limit the rearward movement of the latter to any desired distance so as to limit the distance through which said digging blade may be lowered.

FRED P. NOFFSINGER.

REFERENCES CITED

The following references are of record in the file of this patent:

UNITED STATES PATENTS

| Number | Name | Date |
|---|---|---|
| 1,279,793 | Upton | Sept. 24, 1918 |
| 1,282,657 | Tussing | Oct. 22, 1918 |
| 1,857,212 | Parent | May 10, 1932 |
| 1,869,641 | Wilson | Aug. 2, 1932 |
| 1,921,190 | Johnson | Aug. 3, 1933 |
| 2,330,743 | Rasmussen | Sept. 28, 1943 |
| 2,438,627 | Walz | Mar. 30, 1948 |